Figure 1:
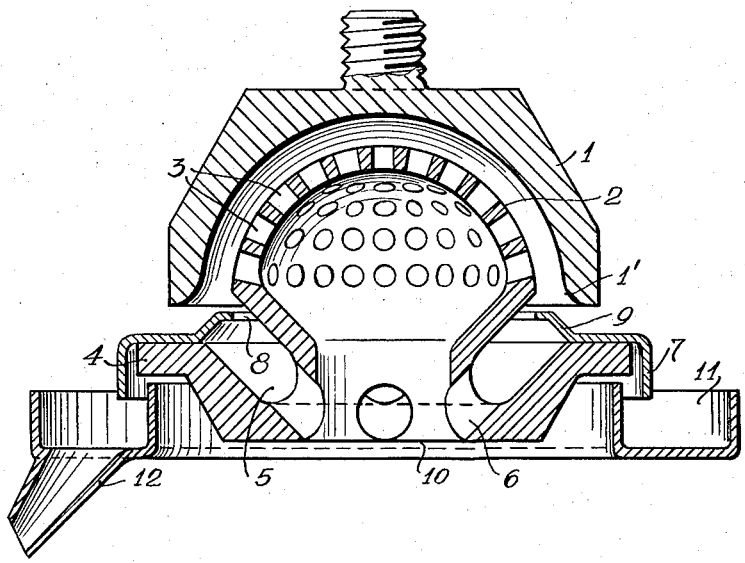

Nov. 13, 1951  Z. KARP ET AL  2,574,922

FRUIT JUICE EXTRACTOR

Filed July 19, 1946

Inventors
Zeev Karp and Max Koffler
by George Benjamin

Attorney

Patented Nov. 13, 1951

2,574,922

UNITED STATES PATENT OFFICE 2,574,922

FRUIT JUICE EXTRACTOR

Zeev Karp, Ashdoth Yaaqov, and Max Koffler, Tel Aviv, Palestine; said Karp assignor to said Koffler Application July 19, 1946, Serial No. 684,986
In Palestine October 30, 1945

1 Claim. (Cl. 100—49)

In the process of extraction of juice from citrus fruit, especially of juice intended for preservation or export, one must be careful lest essential oils contained in the flavedo be squeezed out and mixed with the juice, since said oils make the juice impalatable. Owing to this necessary precaution the extraction of juice is mostly performed by manual labor. The fruit is cut into two parts and the flesh side of each part is pressed by hand towards a rotating fluted cone. The peel of the fruit-part is held in the palm and does not come into contact with any instrument which could attack it. These troublesome manipulations are incurred in spite of the fact that there exist labor saving machines provided with automatically operating instruments, usually cooperating cups and convex members, for performing those operations.

The invention aims at eliminating these shortcomings by a new method of extracting the juice from citrus fruit by squeezing it out by means of cups and preferably perforated convex members entering into them. The main feature of this method resides in the step that the juice squeezed out from the flesh or interior of the fruit is drained off into a juice collector or container, while the oil and other liquid squeezed out from the peel, possibly mixed with some juice, are diverted into separate channels.

The means for performing the new method comprise a hemispherical or semi-oval cup and an analogically shaped, preferably hollow perforated semi-globe or convex member, adapted to enter into the cup; a conical, cylindrical or otherwise shaped apron or ring being provided which surrounds the convex member near its base and is adapted to deflect any liquid flowing down from the outside of the compressed fruit, and to divert it into ducts or channels, other than those conducting the juice. By these means the oil which is coming down along the inner surface of the cup, will flow or drip down on the apron and be diverted away from the convex member. Preferably the convex member is provided with perforations, through which the fruit juice can be drained off. Furthermore the quantity of the oil and the other contaminating liquid can be considerably diminished by making the co-operating inner surfaces of cup and convex member completely smooth, i. e. having no protrusions likely to damage or injure the skin of the flavedo and cause an extrusion or outflow of oil from the disrupted texture of the flavedo. The squeezed out juice escapes almost fully through the perforations without running down on the outer surface of the convex member, where it is likely to encounter and mix with any oil which might flow down along the inner face of the cup.

The new device may be incorporated into various kinds of machines operating by means of cups and squeezing convex members.

Figure 2:
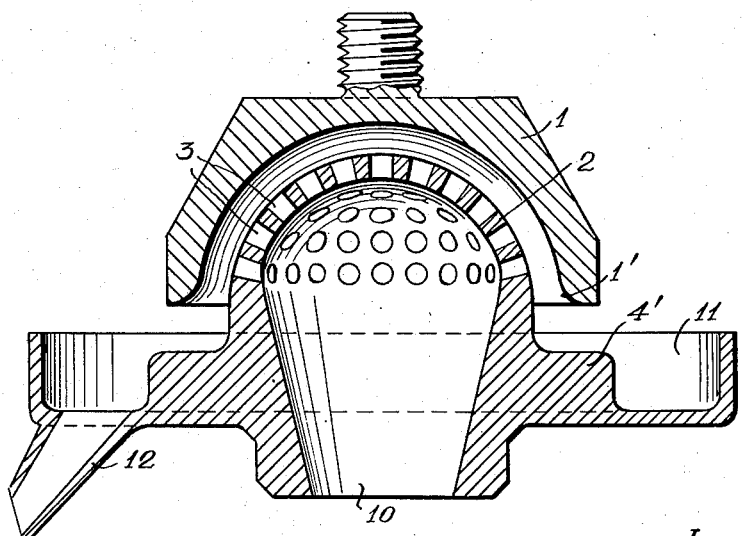

In the annexed drawing the means for performing the invention are shown by way of example in a vertical section in Figs. 1 and 2 in two embodiments and in a position occupied at the end of the squeezing operation.

Adverting first to Fig. 1, the pressure means for squeezing out the juice from the fruit consists as usually of an upper inverted cup 1 and a lower hollow convex member 2. Cup 1 is vertically movable in any appropriate way onto the convex member or vice versa, cup or convex member being screwed or otherwise fastened to a vertical bar moved up and down by any suitable mechanism. The surface of the convex member has the same curvature as the inner surface of the cup, i. e. semiglobal. Both surfaces are smooth and have no ribs or other protrusions. Convex member 2 has a great number of perforations 3, the total area of these perforations being at least one fifth of the squeezing surface of the cup. In the innermost position of the convex member in the cup, the outer edge of the perforated wall of the convex member is above the outer edge of the cup, the height of the perforated part of the convex member being less than the depth of the cup. The pressed out juice passing through the perforations collects within the hollow convex member and is drained off through the outlet 10. Around the convex member and beneath its perforated surface there is provided an outwardly extending flange 4. On this flange rests with its bottom an inverted cup 7 with a central hole 8 in its bottom. The wall of cup 7 forms an apron around the convex member. The edge 9 of the hole 8 of the bottom is turned upwardly so as to lie inside the perimeter of the edge 1' of the inner surface of the cup 1. Between the convex member and the flange there is provided a groove 5 running around the convex member. Bores or holes 6 lead from the groove 5 into the interior of the convex member 2.

In the operation of squeezing out the juice, the bulk of the latter will pass through the perforations 3 and flow out through the outlet of the convex member 2. Only a relatively small amount of juice will flow down the exterior surface of the convex member 2 and pass through opening 8 of apron 7 and openings 6 into the interior of the convex member or be altogether deflected by the upwardly turned edge 9 of the apron 7 from getting into the interior of the convex member or into groove 5. In any case any oil squeezed out of the flavedo and running down along the inner surface of the cup 1 is prevented by apron 7 from entering into groove 5 and mixing with the juice.

A simplified embodiment of the invention is shown in Fig. 2. Here the outwardly extending flange 4 forms an uninterrupted continuation of the curved perforated convex member 2, no groove 5 being provided between the convex member 2 and the flange 4'. Flange 4' constitutes at the same time the deflecting apron. The squeezed out oil running down along the inner surface of the cup 1 is prevented from passing through the perforations 3 and mixing with the juice. The oil dripping down may in both cases be collected in a circular channel 11 and drained off therefrom through a spout 12. In this embodiment too the height of the perforated part of the convex member is less than the depth of the cup.

It would be within the scope of the invention to provide a convex member 2, as shown in Fig. 1, with no perforations. In this case the juice would flow down the convex member and through hole 8 of the apron and openings 6 into the interior of the convex member or below it. Of course with such a convex member, only fruit of a size covering the whole convex member could be worked up; smaller fruit, leaving the lower part of the convex member uncovered would lead to a mixing of fruit juice with peel juice and oil.

What we claim is:

A device for extracting juice from the flesh of halved citrus fruit by squeezing it out by means of a cup and a convex member entering into the cup comprising in combination a hollow convex member provided with perforations in its squeezing wall, through which the juice is drained off, and means for separately collecting and draining off the oil squeezed out from the peel, the outer edge of the perforated wall of the convex member being above the outer edge of the cup and within the latter and the height of the perforated part of the convex member being less than the depth of the cup.

Z. KARP.
KOFFLER, MAX.

REFERENCES CITED

The following references are of record in the file of this patent:

UNITED STATES PATENTS

| Number | Name | Date |
| --- | --- | --- |
| 1,959,615 | Derrah | May 22, 1934 |
| 2,114,218 | Edenfield | Apr. 12, 1938 |
| 2,363,798 | McCulloch | Nov. 28, 1944 |
| 2,420,680 | Pipkin | May 20, 1947 |